United States Patent [19]

Neyer

[11] Patent Number: 4,513,387
[45] Date of Patent: Apr. 23, 1985

[54] METHOD AND AN APPARATUS FOR GENERATING PERIODIC DIGITAL TIME FUNCTION SIGNALS

[75] Inventor: Norbert Neyer, Zürich, Switzerland

[73] Assignee: LGZ Landis & Gyr Zug AG, Zug, Switzerland

[21] Appl. No.: 397,825

[22] Filed: Jul. 13, 1982

[51] Int. Cl.³ .............................................. G06F 3/00
[52] U.S. Cl. .................................. 364/718; 307/265; 328/59; 328/74
[58] Field of Search ...................... 364/718, 719, 715; 307/265; 328/59, 63, 74

[56] References Cited

U.S. PATENT DOCUMENTS

| | | | |
|---|---|---|---|
| 3,579,146 | 5/1971 | Paine et al. | 307/265 |
| 3,937,899 | 2/1976 | Deneberg | 179/84 UF |
| 3,980,960 | 9/1976 | Hutchinson | 307/265 |
| 4,225,936 | 9/1980 | Lesche | 364/718 |
| 4,257,108 | 3/1981 | Igel | 307/265 |
| 4,330,751 | 5/1982 | Swain | 307/265 |
| 4,404,644 | 9/1983 | Howie | 364/718 |

OTHER PUBLICATIONS

Gott et al., "H.F. Data Transmission Using Chirp Signals" Proceedings IEE, vol. 118, #9, Sep. 1971, p. 1162.

Primary Examiner—James D. Thomas
Assistant Examiner—Dale M. Shaw
Attorney, Agent, or Firm—Ernest F. Marmorek

[57] ABSTRACT

A method and an apparatus for obtaining digital periodic time function signals, and wherein each time function signal is defined by an instantaneous frequency varying in dependence of time within a characteristic period T equal to the period of a first clock signal, includes a generator for generating a second clock signal, period counters for cyclically counting the periods of the second clock signal, a divider for deriving a third clock signal from the second clock signal, and wherein the third clock signal is a subharmonic of the second clock signal, a memory which has a plurality of storage cells for storing groups of binary numbers characteristic of the time function signals, respectively, an address counter for sequentially calling up and reading out the storage cells with the aid of the third clock signal, a logic circuit for enabling the count of one period counter with a predetermined delay with respect to the time of call-up of each corresponding storage cell, and bistable multivibrators for inverting the digital instantaneous values of one time function signal after predetermined counts of the periods of the second clock signal, in dependence of the binary number read out from the memory, whereby a selected digital periodic time function signal is generated, in dependence of the corresponding group of binary numbers stored in the memory and representing the time values of the edges of the digital time function signal which is generated.

13 Claims, 7 Drawing Figures 4,513,387

1

METHOD AND AN APPARATUS FOR GENERATING PERIODIC DIGITAL TIME FUNCTION SIGNALS

BACKGROUND OF THE INVENTION

Periodic time function signals are required, for example, as reference signals in coherence receivers for receiving, for example, so called "Chirp" signals. In such coherence receivers a received signal, which may be corrupted by noise, is multiplied in the detection process, on one hand with the reference signal itself, and on the other hand with the reference signal shifted by 90° for eliminating, or at least reducing the interference.

A coherence receiver is described, for example in U.S. Pat. No. 3,937,899 of Denenberg, in col. 2, lines 49 to 69, and col. 3, lines 1 to 43, however, only for the relatively simple case where the reference signal is a pure sinusoidal or cosinusoidal signal, the amplitudes of which are stored in a memory.

SUMMARY OF THE INVENTION

It is a principal object of the above-noted invention to generate periodic digital time function signals, which have within its period T an arbitrary digital form, but have a high accuracy of resolution in spite of a relatively small storage requirement. The frequency accuracy at a frequency of 40 kHz should, for example, be approximately 100 Hz. This object is attained in a method of obtaining digital periodic time function signals with the aid of a memory having a plurality of storage cells and where a predetermined number of the storage cells are assigned to each time function signal, each time function having a time period T, predetermined binary numbers stored in corresponding storage cells defining each periodic time function signal, by steps which include for each of the digital periodic time function signals calculating a first group of binary numbers $x_j$ representing relative time values of their positive and negative going edges by choosing for each of the relative time values an own zero reference point by taking into account the delay time of the memory 3, by using a second period $T_2$ as a time unit, allotting to the binary numbers $x_j$ a predetermined, normally not used binary number 255 = "11111111", in each case an edge is not to be produced, assigning a prearranged number of the storage cells to each of the digital time function signals to be obtained, storing each one of the first groups of binary numbers $x_j$ in those of the storage cells which belong to the digital periodic time function signal, and in such an order of succession that increasing absolute time values related to the binary numbers $x_j$ correspond to increasing values of memory addresses, whereby the absolute time values correspond to the relative time values with the difference that the absolute time values have a single zero reference point common for all of them, generating a first clock signal CL1 for resetting purposes having a period $T_1$ equal to the first period T of the digital periodic time function signals, generating a second clock signal CL2 having the second period $T_2$, which has a predetermined relationship to the first period T, deriving from the second clock signal CL2 a third clock signal CL3 having a third period $T_3$ which is a multiple of the second period $T_2$, binary counting the number of the third periods $T_3$ with the aid of an address counter 2 and allotting this second group of binary numbers to the memory addresses of the storage cells, successive calling up the different storage cells belonging to the digital periodic time function signal, with the aid of the second group of binary numbers and the address inputs of the memory 3, and thereby successively reading of the binary numbers $x_j$ of the first group of binary numbers out of the memory 3, successive parallel loading the binary numbers $x_j$ of the first group of binary numbers in period counters 4 and 5, delayed enabling between each of the loadings during an enabling time interval, only the counting of one of the period counters 4 or 5 with the aid of a logic circuit 12, if an edge of the digital periodic time function signal which belongs to the one period counter must be produced during the enabling time interval, counting the number of second periods $T_2$ during the enabling time beginning with the loaded binary number $x_j$ of the first group of binary numbers until a predetermined reference number is reached, in the moment of reaching the predetermined reference number, inverting the digital instantaneous value of the digital periodic time function signal at the output of a D Flip Flop 6 or 7 with the aid of this D Flip Flop.

It is a further advantage of the invention that the relatively long reading-in times of the read only memory do not cause any disturbance in the generation of the time function signals.

The data values of the digital time function signals are stored in the memory cells not by amplitude, but by time values of their edges.

BRIEF DESCRIPTION OF THE DRAWINGS

For a full understanding of the nature and object of the invention, reference should be had to the following detailed description, taken in connection with the accompanying drawings, in which.

Figure 1:
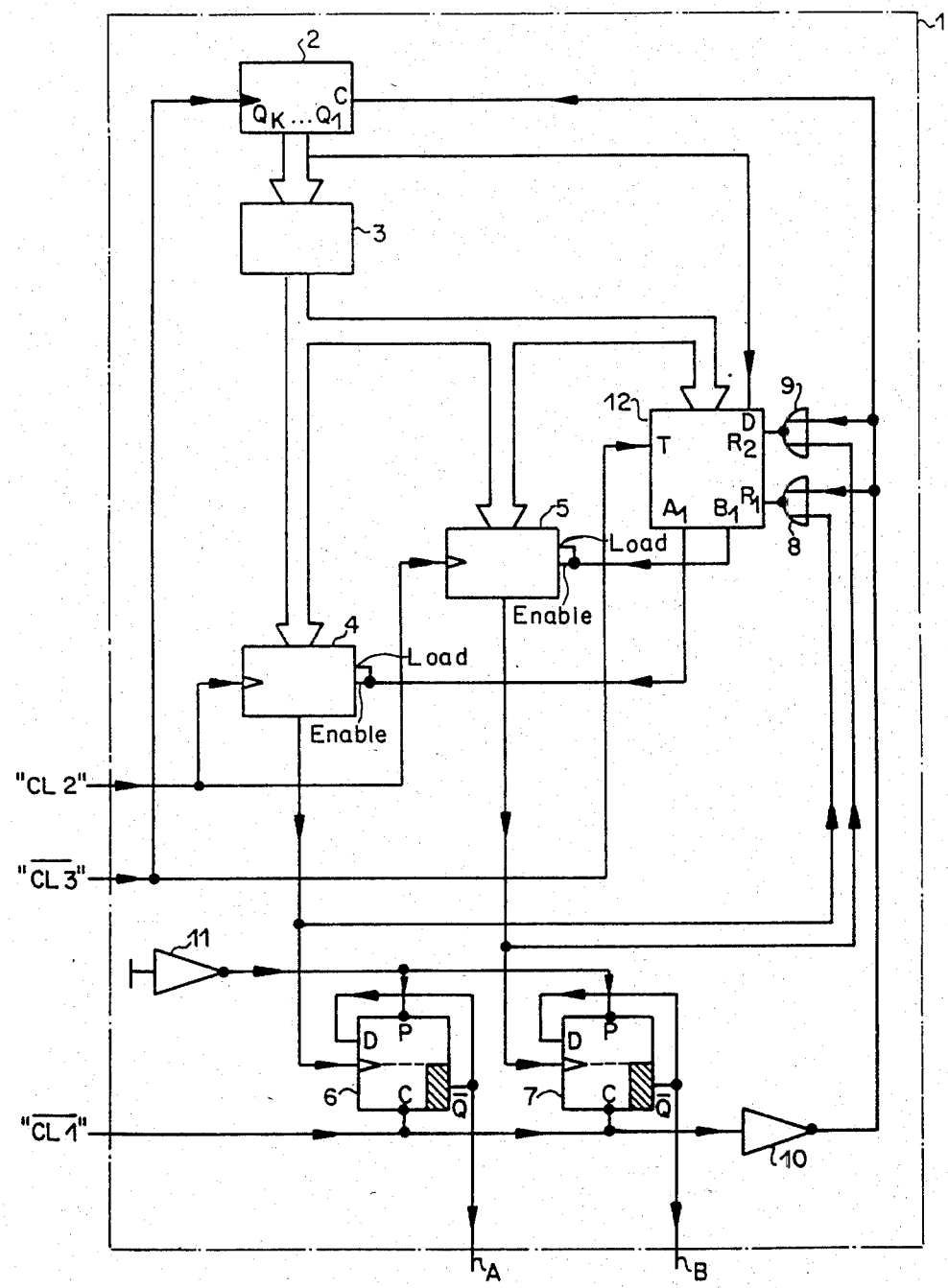
FIG. 1 is a block schematic diagram of a function generator.

The same reference numerals denote in all figures of the drawing the same elements. In the drawing the reset inputs of the individual counters and flip-flops are denoted with a C (C=Clear), the set inputs with a P (P=Preset), and the clock inputs with a white triangle, if they are positive edge-triggered, or with a black triangle, if they are negative edge-triggered. All bistabile multivibrators are D-flip-flops.

DESCRIPTION OF THE PREFERRED EMBODIMENTS

Description of FIG. 1

In carrying out the invention there will be seen in FIG. 1 a function generator 1 for generation of two digital periodic time function signals. The function generator 1 includes an address counter 2, a read only memory (ROM) 3, a first period counter 4, a second period counter 5, a first bistable multivibrator 6, a second bistable multivibrator 7, a first NOR gate 8, a second NOR gate 9, a first inverter 10, a second inverter 11, and a logic circuit 12.

The function generator 1 has first, second and third inputs "CL1", "CL2" and "CL3" for digital clock signals, which are fed by an inverted clock signal CL1, by a clock signal CL2, and by an inverted clock signal CL3. There is further provided a first signal output A for a first generated periodic time function signal, for example a "1 Chirp" signal, and a second signal output B for a second time function signal, for example a "0 Chirp" signal.

Connected to one another each by means of one single conductor are:

The input "CL3" of the function generator 1 with the clock input of the address counter 2, and that of the logic circuit 12;

The input "CL2" of the function generator 1 with the clock input of the first and second period counters 4 and 5;

The "CL1" input of the function generator 1 with the respective reset inputs C of the first and second bistable multivibrators 6 and 7, as well as with the first input of the first and second NOR gates 8 and 9 through the inverter 10, and with a reset input C of the address counter 2;

The least significant bit (LSB) output Q, of the address counter 2 with the data input D of the logic circuit 12;

A first output $A_1$ of the logic circuit 12 with an enable input and the load input of the first period counter 4, and a second output $B_1$ of the logic circuit 12 with an enable input and the load input of the second period counter 5;

The carry output of the first period counter 4 with the clock input of the first bistable multivibrator 6, and with the second input of the first NOR gate 8;

The carry output of the second period counter 5 with the clock input of the second bistable multivibrator 7, and the second input of the second NOR gate 9;

The output of the first NOR gate 8 with the first reset input $R_1$, and the output of the second NOR gate 9 with the second reset input $R_2$ of the logic circuit 12;

The D-input of the first bistable multivibrator 6 with its $\overline{Q}$-output, and with the first signal output A of the function generator 1;

The D-input of the second bistable multivibrator 7 with its $\overline{Q}$-output, and with the second signal output B of the function generator 1;

The respective inputs P of both bistable multivibrators 6 and 7 with the output of the inverter 11, whose input is connected to ground.

All counters are binary counters. The address counter 2 is a K-bit counter, whose K outputs $Q_1, Q_2, \ldots Q_K$ are supplied through a K-bit address bus to the K-bit address input of the read only memory 3. In what follows it is assumed that K=11. In that case there can be used as an address counter 2, for example, a 12 bit CMOS counter of the type MC 14040 of Motorola, Phoenix, Ariz., neglecting the twelfth bit, and as a read only memory 3 there can be used a 2K-EPROM, for example of the type 2716 of Intel, Santa Clara, Calif., since $2^{11} = 2048$. All remaining elements of FIG. 1, as well as of FIG. 3, can be modular elements of the "low power Schottky" Series 74LS of Texas Instrument, Dallas, Tex.

Figure 3:
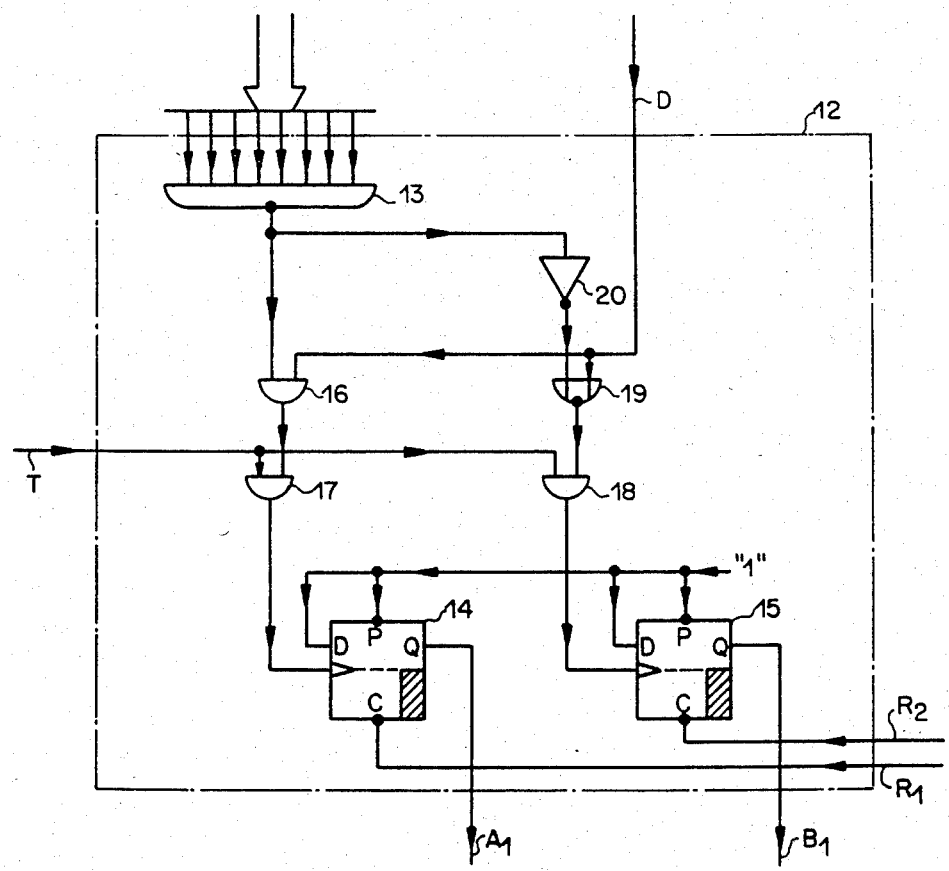
FIG. 3 is a block schematic diagram of the logic circuit, according to the present invention.

The binary data values stored in the read only memory 3 have N bits where, for example, N=8. The N-bit data outputs $Q_1^*, Q_2^* \ldots, Q_N^*$ of the read only memory 3 are connected with the aid of the N-bit data bus to the respective N-bit parallel inputs of the periodic counters 4 and 5, as well as to the N-bit input of the logic circuit 12. As 8 bit period counters 4 and 5 there can be used, for example, two 4 bit binary counters, for example of the type 74LS163 in series, where their "carry" outputs are connected to both inputs of an additional (non-illustrated) AND gate, whose output forms the carry output of the corresponding 8 bit period counters. The enable input of each 8 bit period counter 4 and 5 is then formed by the paralleled "load" inputs of the corresponding two 4 bits binary counters connected to the T input of the first of these two 4 bit binary counters. All D-flip-flops, as well as those of FIG. 3, are, for example, of the type 74LS74. Also type 74LS04 can be used in both FIGS. as inverters.

Functional Description of the Circuit of FIG. 1

Figure 5:
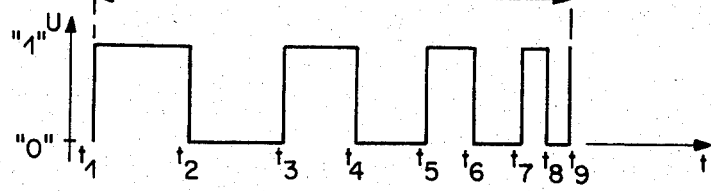
FIG. 5 is an amplitude/time diagram of a digital "Chirp" signal corresponding to the frequency/time diagram of FIG. 4.

Each of both digital periodic time function signals generated in the function generator 1 looks like the digital time function signal represented in FIG. 5. Edges of each of these time function singals appear at times $t_j$, with J=1,2,3. . . . Both digital time function signals have generally different values of $t_j$.

Figure 4:
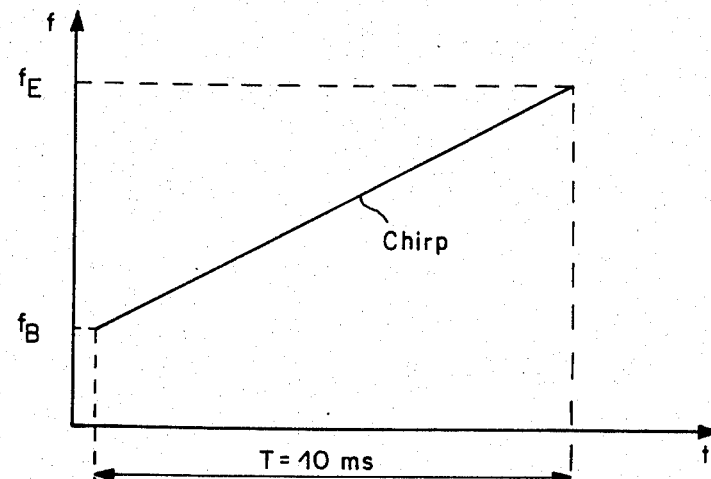
FIG. 4 is a frequency/time diagram of a linear "Chirp" signal.

Both digital periodic time function signals are, for example, digital linear "Chirp" signals. In this case the representation of FIG. 5 remains valid and is the amplitude/time diagram of one of both digital linear "Chirp"-signals. "Chirp"-signals are better known by their frequency/time diagram. The last one for linear "Chirp"-signal is represented in FIG. 4. The representations of FIG. 4 and of FIG. 5 are equivalent; they are two different representations of the same subject matter.

Conclusion: If it is desired to generate a frequency/time diagram of the type shown in FIG. 4, then it will be understood that it is sufficient to generate an amplitude/time diagram or waveform, as shown in FIG. 5, the digital amplitudes of which (logic values "1" and "0") are known. The only unknown parameters of FIG. 5 are therefore the edges of the signal, or, expressed in other words, the moments in time $t_j$, where j=1,2,3 . . . at the time of occurrence of the edges of the waveform shown in FIG. 5.

The generation of the above-noted "Chirp" signal is then broken down into the following steps:

Facultative preliminary step

When generating digital linear "Chirp"-signals by starting with frequency/time diagrams like the one of FIG. 4, in a first step one must transform the frequency/time diagrams in the corresponding and equivalent amplitude/time diagrams like the one of FIG. 5.

This is realized by calculations as follows:

From "HF data transmission using chirp signals" Proc. IEE, Vol. 118, No. 9, September 1971, page 1162 it is known that a sinoidal linear chirp signal f(t) is represented by the mathematical formula.

$$f(t) = \cos\left(\omega_o t + \frac{\pi F}{T} t^2\right), \text{ with } -T/2 \leq t \leq T/2.$$

or, by changing the time zero reference point from $-T/2$ to zero, $$f(t) = \sin\left(\omega_0 t + \frac{\pi F}{T} t^2\right), \text{ with } 0 \leq t \leq T.$$

T is the period of the "Chirp"-signal, when the "Chirp"-signal is a cyclical one.

$\omega_0 = 2\pi f_B$, where $f_B$ is the instantaneous frequency at the beginning of period T (FIG. 4).

F is the frequency sweep ($f_E - f_B$), where $f_E$ is the instantaneous frequency at the end of the period T (FIG. 4).

The times $t_j$ corresponding to the zero crossings of the sinoidal chirp signal are given by $$f(t_j) = \sin\left(\omega_0 t_j + \frac{\pi F}{T} t_j^2\right) = 0 \text{ or } \omega_0 t_j + \frac{\pi F}{T} t_j^2 = k_j \pi,$$

with $k_j = 0,1,2,3\ldots$

The last equation is an equation of second order $$t_j^2 + \frac{\omega_0 \cdot T}{\pi F} \cdot t_j - \frac{k_j \cdot \pi \cdot T}{\pi F} = 0 \text{ or}$$

$$t_j^2 + 2 f_B \frac{T}{F} t_j - k_j \frac{T}{F} = 0, \text{ or}$$

$$t_j^2 + 2 f_B T' t_j - k_j T' = 0,$$

with $T' = T/F$ whose positive solutions are:

$$t_j = -f_B \cdot T' + \sqrt{f_B^2 \cdot T'^2 + k_j T'},$$

with $j = 1,2,3,4,\ldots$.

When a digital "Chirp"-signal is used instead of a sinusoidal one, the last formula remains valid with the exception that the values of $t_j$ thereby represent the times corresponding to the edges of the digital "Chirp"-signal. This is because digital "Chirp"-signals are nothing else than sinoidal "Chirp"-signals, whose amplitude is infinite and whose instantaneous values are clamped to the value of "logical 1". This clamping has no influence on the zero crossing points, which become now positive and negative going edges of the digital "Chirp"-signal. With other words, the values of $t_j$ found by the last formula for every value of $k_j = 0,1,2,3,\ldots$ are the searched values $t_j$ of FIG. 5, with $j = 1,2,3,4,\ldots$. The highest value of $k_j$ is the value, which corresponds to the highest value of $t_j \leq T$.

When the digital linear "Chirp"-signals are generated by starting directly with amplitude/time diagrams like the one of FIG. 5, this first transforming step is naturally superfluous and the values of $t_j$ are taken directly out of diagrams like FIG. 5.

One of both "Chirp"-signals, for an example a "1-Chirp" signal representing a logic value "1", appears on the first signal output A of the function generator 1, and a "0-Chirp" signal, representing the logic value "0", appears on the second signal output B of the function generator 1. During a period T of the periodic time function signal the frequency of the digital "Chirp"-signal varies according to an arbitrary mathematical function of the time from an initial frequency $f_{B,i}$ to a final frequency $f_{E,i}$, where the $i=0$ relates to the "0-Chirp" signal and the $i=1$ relates to the "1-Chirp" signal. In FIG. 4 the mathematical function is a linear function.

The following relationship applies, for example, $$f_{E,1} - f_{B,1} = f_{E,0} - f_{B,0} = 2 \text{ kHz}$$

and $$f_{B,0} - f_{B,1} = 400 \text{ kHz}.$$

If these "Chirp"-signals are used as reference signals in a coherence receiver, and if the coherence receiver receives intelligence signals, which are transmitted through the conductors of a mains supply system, then the highest terminal frequency $f_{E,i}$ of the reference signal is, for example, approximately equal to 40 kHz, and the lowest initial frequency $f_{B,1}$ is, for example, 10 kHz.

Figure 6:
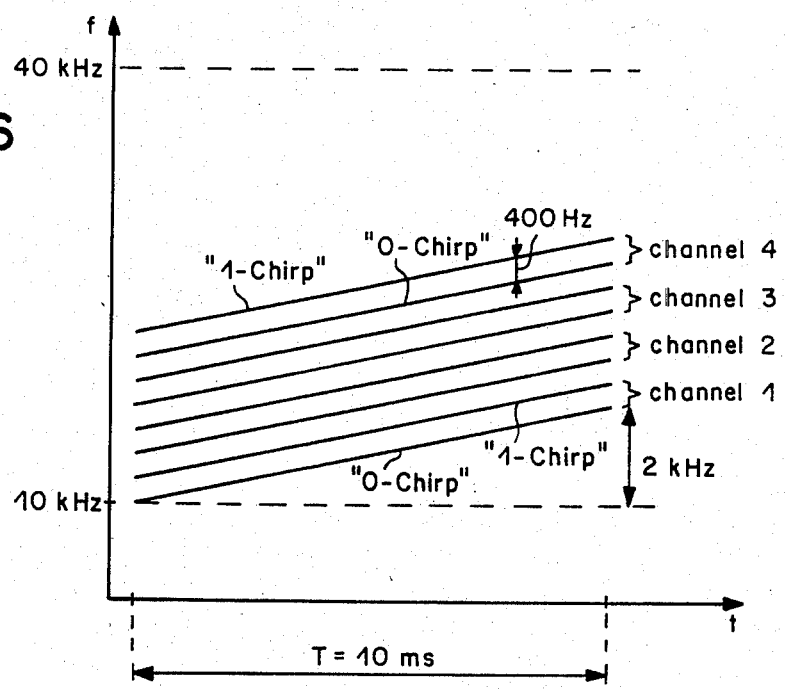
FIG. 6 is a schematic representation of a plurality of channels within a frequency range of 10 kHz to 40 kHz of a transmission system, when this one is a mains supply system.

The aforedescribed frequency range of the mains supply system can be, for example, divided up into a plurality of channels as follows:

Channel 1:
"Chirp 0": 10 kHz–12 kHz
"Chirp 1": 10.4 kHz–12.4 kHz
Channel 2:
Chirp 0": 10.8 kHz–12.8 kHz
"Chirp 1": 11.2 kHz–13.2 kHz
and so on, up to a frequency of 40 kHz (see FIG. 6).
cNumerical Example 1
Channel 1, "Chirp 0" has $$f_B = f_{B,0} = 10^4 \text{ Hz}$$

$$F = 12 \text{ kHz} - 10 \text{ kHz} = 2 \cdot 10^3 \text{ Hz}$$

$$T' = T/F = 10 \text{ ms}/2 \text{ kHz} = 5 \cdot 10^{-6} \text{ sec}^2,$$

with $T = 10$ ms $$t_j = -f_B T' + \sqrt{f_B^2 T'^2 + k_j T'}$$

$$= (-5 \cdot 10^{-2} + \sqrt{25 \cdot 10^{-4} + k_j \cdot 5 \cdot 10^{-6}}) \text{ sec.}$$

$$= (-50 + \sqrt{2500 + 5 \cdot k_j}) \text{ ms}$$

with $$k_j = k_1 = 0: t_1 = -50 + \sqrt{2500} = 0 \ (= \text{Starting point})$$

$$k_j = k_2 = 1: t_2 = (-50 + \sqrt{2500 + 5}) \text{ ms}$$

$$k_j = k_3 = 2: t_3 = (-50 + \sqrt{2500 + 10}) \text{ ms}$$

$$k_j = k_{221} = 220: t_{221} = (-50 + \sqrt{2500 + 1100}) \text{ ms} =$$

$$(-50 + 60) \text{ ms} = 10 \text{ ms} = T.$$

Step 1

Transformation by calculating of the calculated $t_j$ values into binary $x_j$ values (first group of binary numbers), representing relative time values of the edges. The $t_j$ values have a common reference point at a moment in time equal to zero, and are expressed for example in ms. The $x_j$ values, however, have each a different own zero reference point, each being expressed as the number of periods of the second clock signal CL2

($T_2 = 0.05$ μsecs). The reference point in time of each $x_j$ value is the moment in time when the negative going edge of the non inverted third clock signal CL3 (FIG. 2, last line) appears during one of the last M cells, which are read out of the read only memory 3 just before the edge $t_j$ belonging to $x_j$ appears, where M is the number of digital periodic time function signals which must be generated. In the case of two "Chirp"-signals M=2 and one of the last two cells is then even-numbered addressed and the other odd-numbered addressed. Which of the M last cells must be chosen is explained under step 3.

Step 2

In each case an edge is not to be produced during the corresponding time interval, a predetermined, normally not used binary number, for example 255="11111111" is allotted to the corresponding binary number $x_j$.

Step 3

Preliminary there are assigned a certain prearranged number of storage cells of the read only memory 3 to each of the digital periodic time function signals, thus here to each "Chirp"-signal.

The addresses of the read only memory 3 can be associated with the two digital periodic time function signals in either of two ways, as shown below:

First way: The data values $x_j$ of all M time function signals which have the same value of j, have the same addresses, in which case the output of all the M period counters, 4 and 5 in the case of two "Chirp"-signals, are enabled for output simultaneously, which has the disadvantage, however, that the demand for storage cells is very large. In this case M storage cells per address are required, or in other words the need arises for M separate read only memories 3, which are operated in parallel. In this case only the last cell of the M last cells mentioned under step 1 is used for determining the reference points in time of each value $x_j$.

Second way: Alternatively, time multiplexed addresses are associated with the data values $x_j$ of the M time function signals, for example odd addresses, whose least significant bit $Q_1 = 1$, are associated with a "1-Chirp" signal and even-numbered addresses, whose least significant bit $Q_1 = 0$, are associated with a "0-Chirp" signal. In this case the data from the period counters 4 and 5 are not enabled simultaneously, but are enabled in a time-alternating manner successively. In what follows this latter case will be assumed to apply, because it is economically the more interesting. One-half of the storage locations can be saved using this method.

In this case the last even address numbered cell of the M=2 last cells mentioned under step 1 is used for determining the reference points in time of each value $x_j$ belonging to the "Chirp 0"-signal and the last odd address numbered cell is used for determining the reference points in time of each value $x_j$ belonging to the "Chirp 1"-signal. When M≠2, accordingly each of the M time function signals is assigned to one of the mentioned last M cells for determining the reference points.

It is worth noting that choose one of both ways has only influence on the reference points, the values of $x_j$, the addresses of the storage cells, where these values $x_j$ are stored for each of the M time function signals and on the number of needed storage cells. Especially the chosen way has no influence on the values of the frequencies of the three clocks and on the hardware upresented in FIG. 1 and in FIG. 3.

One value of $x_j$ is always stored in that storage cell of the read only memory 3 which belongs to the reference point in time of this value of $x_j$.

Numerical Example 2

Figure 2:
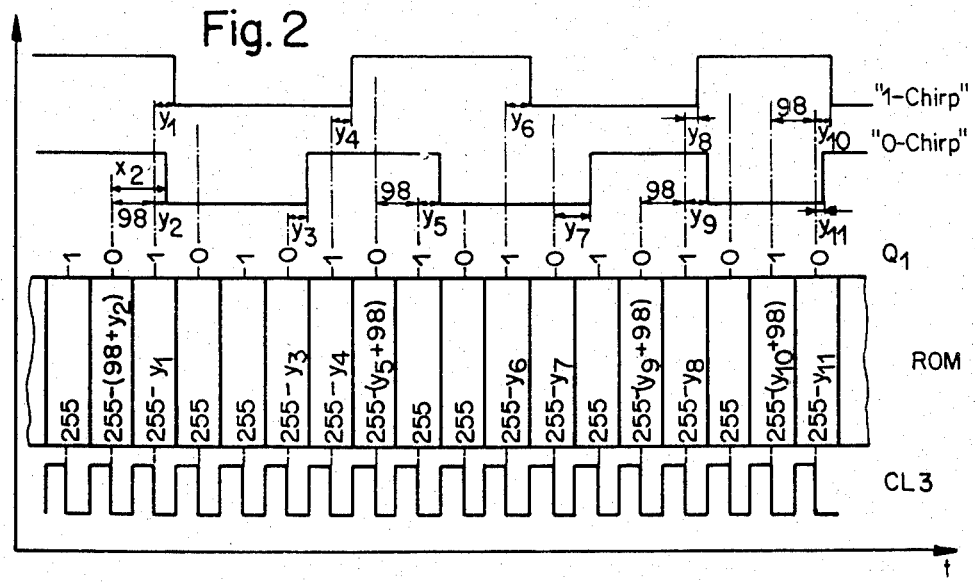
FIG. 2 is a schematic time diagram of the data values to be stored.

In FIG. 2 the reference point in time of the first negative going edge of the "0-Chirp"-signal (second line of FIG. 2) is the negative edge of the third clock signal CL3 (fifth line of FIG. 2), which is drawn below the second storage cell from the left hand of the read only memory (ROM) 3 (fourth line of FIG. 2). This second storage cell is the storage cell belonging to said reference point, and in this cell normally the calculated value of $x_2$ is stored, which is the horizontal time difference between the first negative going edge of the "0-Chirp"-signal and the negative going edge drawn below the second storage cell of the third clock signal CL3. In the drawing of FIG. 2 not $x_2$ but $255 - x_2 = 255 - (y_2 + 98)$, with $x_2 = y_2 + 98$, is stored in this second cell. The reason of this will be explained later.

Step 4

The calculated binary values $x_j$ of each "Chirp" signal are stored in the cells of the read only memory 3 as N-bit binary values in the same time order as they are numbered, namely starting with $x_1$ for the lowest-numbered address, and continuing with increasing values of j ($x_2, x_3, x_4, \ldots$) for increasing values of the addresses. This means that increasing absolute time values $t_j$ related to $x_j$ correspond to increasing values of memory addresses.

Step 5

Figure 7:
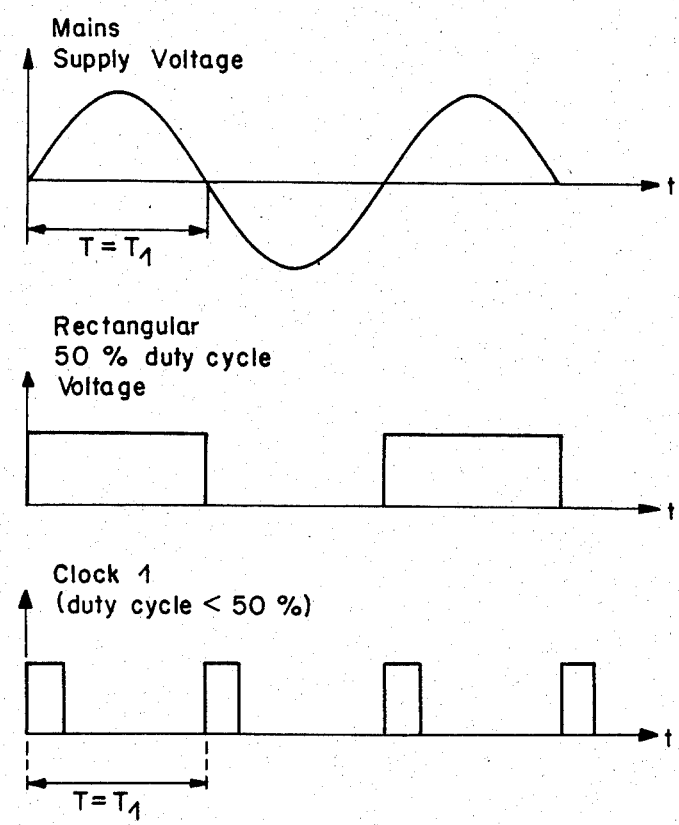
FIG. 7 are time diagrams of different clock signals.

The period $T_1$ of the first clock signal CL1 is equal to the period T of the periodic time function signal, and the duration of its impulses are, for example, 1 μs, or at least smaller than one-quarter of the period $T_3$ of the inverted third clock signal CL3. To facilitate synchronization with the frequency of the mains supply, the period $T_1$ is advantageously set equal to one-half the period of the mains frequency, thus in Europe set sequal to 10 ms which is equivalent to a frequency $f_1 = 100$ Hz and in U.S.A. set equal to 8 ms which is equivalent to frequency $f_1 = 120$ Hz. In this case the first clock signal CL1 is generated, for example, with the aid of comparators, for example of the type LM311 of National Semiconductor, Santa Clara, Calif., to transform the sinoidal voltage of the mains supply into a rectangular voltage with duty cycle 50%, and of two monostable multivibrators, for example of the type 74LS221, to reduce the value of the duty cycle, both in a known manner, from the mains supply frequency (FIG. 7, line 1 to 3.). At the beginning of each time period T of the periodic time function signals the positive-going edge of the clock signal CL1 resets the function generator 1 into the starting state, by both bistable multivibrators 6 and 7 being reset directly, by the address counter 2 being reset through the first inverter 10, and by both enable flip-flops 14 and 15 of logic circuit 12 (FIG. 3) being additionally reset through the two NOR gates 8 and 9 to zero. This moment corresponds to the starting point of one period T of the digital time function signals and is common to all of them. This starting point always corresponds in time with one zero crossing point of the mains supply voltage, and clock 1 is thus synchronized with the frequency of the mains supply. By resetting both bistable multivibrators 6 and 7 a "logical 1" appears at the $\overline{Q}$ outputs of these multivibrators and thus also at the outputs A and B of the function generator 1. By doing so it is assumed for FIG. 1 that both "Chirp"-signals begin with a starting value equal to "logical 1" at time $t_j=t_1$ (FIG. 5).

Step 6

The second clock signal CL2 is generated, for example, with the aid of a quartz oscillator of the type 74LS321.

Step 7

The third clock signal CL3 is obtained in a known and therefore (non-illustrated) manner by synchronous binary division of the frequency $f_2$ of the second clock signal CL2, for example, with the aid of two 4 bit-binary counters of the type 74LS163 connected in series, and with an additional D-flip-flop of the type 74LS74 post-coupled thereto. The clock signal CL2 feeds the clock inputs of the two 4 bit binary counters in parallel, which, when connected in series, operate as an dividing 8 bit-binary counter for dividing $f_2$ to obtain $f_3$.

Step 8

From this time onward and beginning at zero, the address counter 2 starts binary counting of the number of negative-going edges of the inverted third clock signal CL3 (second group of binary numbers). These negative-going edges of the inverted clock signal CL3 correspond in time to the positive-going edges of the non-inverted clock signal CL3 (FIG. 2).

The remaining part of each time function signal is now generated as follows:

To each time function signal corresponds a bistable multivibrator, whose $\overline{Q}$ output is connected to that signal output of the function generator 1 which belongs to the time function signal. For example the first bistable multivibrator 6 and the first signal output A both belong to the "Chirp 1"-signal, and the second bistable multivibrator 7 and the second signal output B belong to the "Chirp 0"-signal. The successive digital values arising at the output $\overline{Q}$ of one of these enable flip flops are thus identical with the instantaneous values of the corresponding time function signal which will be generated. Each time function signal keeps his initial value "logical 1" until its edge time $t_1$ is reached, and at this time a positive going signal edge at the clock input of that bistable multivibrator, which belongs to said time function signal, inverts the digital logical value at the $\overline{Q}$ output of this bistable multivibrator (6 or 7) and thus also the digital value of the corresponding time function signal at the corresponding signal output (A or B) of the function generator 1. The time function signal keeps now this new value "logical 0" until its edge time $t_2$ is reached. At this time $t_2$ the digital value at the output $\overline{Q}$ of the corresponding bistable multivibrator 6 or 7) is inverted once more and becomes "logical 1". This is continued until the highest value of $t_j$ is reached a short time previous to or exactly at the end of the period T of the time function signal. It is worth noting that the value of one $t_j$ is generally different for each time function signal with the exception of the value of $t_j=t_1$ which is common for all signals (starting point).

Positive going signal edges at the clock input of that bistable multivibrator (6 or 7) which belongs to the function signal, are generated at the time $t_j$ as follows:

Step 9

The inverted clock signal CL3 determines the time when the 2040 addresses of the read only memory 3 are called up during the T=10 msec duration of a time function signal. This is simply accomplished by the periods of the inverted clock signal CL3 being counted in a binary manner by the address counter 2, and by the binary K-bit counts successively reaching the address input of the read only memory 3. The available time for each address is thus (10/2048) ms, which corresponds to a frequency $f_3=(2048/10 \text{ ms})=204.8$ kHz. Because the address counter 2 counts the number of periods of the inverted third clock CL3 the K-bit count of this counter is successively increased, and therefore also the K-bit value of the addresses of the read only memory 3. These addresses successively and continuously call up the N-bit data values $x_j$ of all storage cells of the read only memory 3.

The binary values of $x_j$ therefore appear successively and in the correct sequence at the data output of the read only memory 3.

Step 10

One period counter corresponds to each time function signal in the case of two "Chirp"-signals one of the period counters 4 or 5.

Since the load input of each period counter (4 and 5) is connected to the enable input of its own period counter, it has the value "logical 0" when the period counter is not enabled, this is to say during the time intervals between one positive going edge and the following negative going edge of the third clock signal CL3. During these time intervals the successive N-bit binary values $x_j$ of one time function signal are successively parallel loaded in all period counters (5 and 6), irrespective whether they are associated with one time function signal, or with another one, upon their appearance at the N-bit parallel inputs of all these counters (4 and 5) with the aid of the next positive-going edge of the second clock signal CL2, whose frequency $f_2$ is a multiple of the frequency $f_3$ of the clock signal CL3.

For example the frequency is chosen equal to $98 \cdot f_3 = 98 \cdot 204.8$ kHz $\approx 20$ MHz, where the number 98 is an arbitrary number, whose meaning is that there exist 98 counting steps of the period counters (4 and 5) during one address counting step of the address counter 2. The bigger number 98 is, the higher is the accuracy of the reproduction of the time values $t_j$ and $x_j$.

As a result of the relatively long reading times of the data out of the read only memory 3, the enabling of one of the period counters (4 or 5) is delayed with respect to the call up time of these data. Advantageously the time delay is selected to be one-half a period $T_3/2$ of the clock signal CL3. This time delay is taken into account when calculating the data $x_j$ to be stored in the read only memory 3.

The delay of $T_3/2$ is obtained by triggering both enable flip flops 14 and 15 of the logic circuit 12 (FIG. 3) with the positive going edge and the address counter 2 (FIG. 1) with the negative going edge of the inverted third clock signal CL3.

Step 11

The logic circuit 12 of FIG. 3 enables in this case in the center of the period $T_3$ of the clock signal CL3, namely at the time of the negative-going edge (if a certain condition is fulfilled, for example that the called-up data value of the read only memory is different from 255):

the count of the first period counter 4 when, for example $Q_1=1$ (odd numbered address), by an output signal at the first output $A_1$, and the count of the second period counter 5 when, for example $Q_1=0$ (even numbered address), by an output signal at the second output $B_1$.

Thus the logic circuit 12 enables the count of the period counter 5 in the case of even-numbered Addresses ("0-Chirp" signal), or the count of the period counter 4 in the case of odd-numbered addresses ("1-Chirp" signal) during the time intervals beginning with the reference point associated with $x_j$ and ending with the time $x_j$. Each period counter 4 or 5 counts during these enabled time intervals that number $x_j$ of periods of the second clock signal CL2 ($f_2=20$ MHz), which, is loaded in the enabled counter just before the beginning of the corresponding time interval. As already described under Step 1, these periods of clock 2 serve as time units for $x_j$.

Step 12

The period counters 4 and 5 are for example down counters. They count down from the loaded value $x_j$ to the reference number zero. When the counted value reaches zero, there appears at the carry output of the corresponding period counter 4 or 5 a logic "1", which, on the one hand newly inhibits the logic circuit 12, and therefore the count of the enabled period counter 4 or 5, through one of the two NOR gates 8 or 9, and, on the other hand, flips over with its positive-going edge that bistable multivibrator 6 or 7 belonging to the counter.

Step 13

Each bistable multivibrator 6 and 7 has a feedback from its $\overline{Q}$ output to its input D. By this means the digital value of the $\overline{Q}$ output signal of this bistable multivibrator and thus also the instantaneous value of the associated time function signal is inverted as already described under step 8.

Numerical Sample Calculation

Let the frequency $f_2$ of the clock signal CL2 be 20 MHz. The corresponding time period $T_2$ is then 0.05 μs. Into the dividing 8 bit-binary counter there is, for example, loaded the binary value of the number 207, so that the binary counter counts the impulses of the clock signal CL2 from 207 to $2^8=256$, namely 49 bits or values, (note that $207+49=256$). With the aid of its "carry" output signal and an additional inverter, for example of the type 74LS04, it can subsequently load again the binary number 207 with the aid of its "load" inputs. The frequency $f_2=20$ MHz of the clock signal CL2 is therefore divided by 49. The so-divided 20 MHz frequency is divided in a postcoupled D-flip-flop once more by a factor of 2, so that the total divisor $=2\times49=98$. The so generated frequency $f_3$ of the clock signal CL3 therefore has a value $f_2/98=20$ MHz/98$=204,081$ kHz, which corresponds to a period $T_3=4.9$ μs. As the address counter 2 counts the impulses of the clock signal CL3, it can call up during a period, for example, of $T=T_1=10$ ms of the time function signal to be generated 10 ms/4.9 μs$=2040$ addresses, so that the proposed 2k-EPROM memory of the type 2716 having $2^{11}=208$ storage cells, is fully adequate.

When selecting the frequency $f_3$ of the inverted clock signal CL3 it is, however, necessary to note that at a given value of the frequency $f_3$ the time interval between two successive edges of the time function signals to be generated may not fall below a certain value, since otherwise the two data values $x_j$ referred to the two successive edges would have to be stored under the same address, which is impossible.

Each N-bit data value $x_j$ of the read only memory 3 appears during a period $T_3=4.9$ μs of the clock signal CL3, namely during 98 periods $T_2=0.05$ μs of the clock signal CL2 on the N-bit parallel inputs of the two period counters 4 and 5. They are loaded in both period counters at the start of the period $T_3$ thereinto, and remain stored therein until either the count is enabled, or, if this does not occur, up to the start of the next period $T_3$, when the next N-bit data $x_j$ is loaded. At most only one of both counters is enabled. No period counters are enabled only in the case when the binary value $x_j$ of 255 is stored in the period counters 4 and 5.

The data values $x_j$ stored in the read only memory 3 represent the digital time function signals to be generated not by amplitude, but by time of their edges, namely expressed in the number of periods $T_2$ of the clock signal CL2. A specific value $x_j$ corresponds to each edge of the digital time function signal to be generated. In what follows it will be assumed that this data value $x_j$ is stored in the last address called up prior to the appearance of that edge and where that address corresponds to the associated time function signal. When allotting the addresses it is to be noted that the moment of time corresponding to each edge is delayed with respect to the moment of time during which addresses are called up; in the aforedescribed example it is assumed that this time delay is equal to one-half the period $T_3$, namely $98/2=49$ periods $T_2$.

If all time function signals have equal addresses (way 1), then there are required at least 98 values of $x_j$ per period $T_3$. If, however, the addresses of h time function signals are multiplexed (way 2), then at least $98\times h$ values of $x_j$ are required. As the latter case has been assumed in the example given above, there are required at least $98\times2=196$ values of $x_j$ for the generation of $h=2$ time function signals.

In the latter case $N=8$ can be selected, as the number of values $x_j$ then amounts to $2^8=256>196$. These therefore have values ranging from 0 to 255.

Since 196 meaningful values are required for the generation of two time function signals with multiplexed addresses, the values from 1 to 196 have a concrete meaning, namely they denote, calculated form the negative-going edge of the clock signal CL3, the number of periods $T_2$ of the clock signal CL2 to be counted up to the generation of the next edge of the associated time function signal.

The values 1 to 98 are required, if the edge of the time function signal falls within a time interval when its own address is valid delayed by one-half period $T_3$. The values 99 to 196 however, are required, it this edge falls within a time interval when the address of the other time function signal is valid also delayed by $T_3/2$. If the data values 1 to 98 are denoted by $y_j$, then the data values 99 to 196 can be denoted by $(y_j+98)$, with $y_j\leq98$.

The remaining data values of $x_j$, which lie outside the values region 1 to 196, are meaningless, except that a certain of these data values, for example the data value $255=$"11111111", is associated with the meaning "no edge during the corresponding time interval". In practice this data value 255 will be stored generally in most of the storage cells. This fact is the deeper reason for permitting the use of multiplexed addresses, and therefore a saving of storage cells.

If the two period counters 4 and 5 are down counters, then a period counter 4 or 5 starts to count downward from the loaded data value $x_j$ as soon as it is enabled in the center of a period $T_3$ at the negative going edge of the clock signal CL3. If the zero value = "00000000" has been reached, the correct time moment for an edge of the associated time function signal has arrived, as the period counter 4 or 5 has in the meantime counted $x_j$ periods $T_2$ of the clock signal CL2. A logical "1" appears at the carry output of the corresponding period counter 4 or 5, whose positive-going edge flips over the postcoupled bistable multivibrator 6 or 7 at the right time, and therefore effects at the correct time an edge of the associated time function signal.

If, however, not a down counter, but an up counter is selected for the period counters 4 or 5, as for example the aforedescribed type 74LS163, then in the read only memory 3 must not be stored the data values $x_j$, but the values $(255-x_j)$ which can then assume meaningful values $(255-196)=59$ to $(255-1)=254$. If, as shown in FIG. 2, the notation $y_j$ is used, then the data values $(255-y_j)$ or $[255-(y_j+98)]$ are to be stored in the storage cells. Here the general notation for 255 is equal to $(2^N-1)$, which is the highest binary value of an N-bit binary number.

The period up counter counts, starting from each value $(255-x_j)$ loaded thereinto, upward up to the reference value $255=$"11111111".

Upon reaching the value 255, there appears a logic value "1" on the "carry" output of the period up counter, which controls the "clock" input of the D-flip-flop postcoupled thereto, so that the D-flip-flop changes its state at the moment a logic value "1" appears on the "carry" output of the period counter.

According to the present state of the art, normally when generating a frequency of 40 kHz, in the most unfavorable case there are generated at a frequency $f_3=204,081$ kHz for a period of the generated frequency at most 204,081 kHz/40 kHz=5 edge values of the time function signal, which corresponds to a precision of the edges of $\pm 40$ kHz/5 = $\pm 8$ kHz. By the aforedescribed new method however in the same case 20 MHz/40 kHz=500 edge values per periode of the generated frequency are maximally generated, which corresponds to a precision of $\pm 40$ kHz/500 = $\pm 80$ Hz. This means that the error is smaller by a factor of 100.

Numerical Illustration

Assume that for the generation of the frequency/time diagram shown in FIG. 4 of a "0-Chirp" signal an edge must be obtained according to FIG. 5 at a time $t_2$, and that $t_2$ corresponds to a calculated value $x_2=9$.

The value $255-x_2=255-9=246=$"11110110" ($=2^7+2^6+2^5+2^4+2^2+2^2$) is stored in the storage cell preceding the edge associated with the value $x_2$ and having an even-numbered address, which is shown in FIG. 2 as the second storage cell from the left.

The reference point or time for $x_2$ is that moment in time during which the negative-going edge of the clock signal CL3 appears, which is shown immediately below the corresponding storage cell of the read only memory 3, namely the second storage cell from the left of the ROM shown in FIG. 2. After $x_2$ periods of the timing signal CL2 (0.05 $\mu$s when $f_2=20$ MHz), namely $x_2 \cdot 0.05$ $\mu$sec following this reference point or time, the "0-Chirp" signal must change its state. The counter 5 counts from $246=$"11110110" to $255=$"11111111" $x_2=9$ periods of the clock signal CL2, and subsequently changes the state of the D-flip-flop 7, the output of which corresponds to the "0-Chirp" signal. It will, of course, be recalled that $y_2$ of FIG. 2 is simply $(x_2-98)$.

Description of FIG. 2

In the timing diagram according to FIG. 2 the time t is used as an abscissa. In the first line of FIG. 2 the "1-Chirp" signal, and in the second line the "0-Chirp" signal is illustrated as an impulse diagram. In the third line there are shown the alternating 0/1 values of the least significant bit $Q_1$ of the addresses of the read only memory, and in the fifth line the impulses of the clock signal CL1. Line 4 is a schematic representation of the data values $(255-y_j)$ or $[255-(y_j+98)]$ to be called up at the time of the positive-going edge of the clock signal CL3, and stored in the read only memory 3.

The timing diagram of FIG. 2 is based on an alternated multiplexed address scheme of the two "Chirp" signals (way 2). All address fields of line 4 located below a "0"-value of $Q_1$ therefore belong to the "0-Chirp" signal, and the remaining address fields located below a "1"-value of $Q_1$ belong to the "1-Chirp" signal. It should be noted that $y_j$ always represents the number of periods $T_2$ counted from the center of an address field.

In FIG. 2 there can be recognized the various possible relative time positions of the edges of the two "Chirp" signals in relation to the associated addresses and the data values to be stored therein $(255-y_j)$ or $[255-(y_j+98)]$.

The invention will be better understood with the aid of the following example.

Numerical Example 3 (FIG. 2)

The last negative-going edge of the "0-Chirp" signal is accomplished at a moment in time which is situated in the time interval where the data value $(255-y_8)$ of the edge of the "1-Chirp" signal is counted from the center of the field where $(255-y_8)$ is stored to the edge, or more generally formulated, where the data value of the "1-Chirp" signal could just have been counted, as also a non counted data value 255 of the "1-Chirp" signal could have been stored there. The data value $y_9$ belonging to the edge of the "0-Chirp" signal must therefore be stored one address field ahead, but not as a value $(255-y_9)$, but as a value $[255-(y_9+98)]$, the number 98 corresponding to the fact that it is not the correct field, but a field ahead.

Description of FIG. 3

The logic circuit 12 illustrated in greater detail in FIG. 3 consists of a "NAND" gate 13 having N=8 inputs, which form the N-bit input of the logic circuit 12, of a first enable flip-flop 14, a second enable flip-flop 15, a first AND gate 16, a second AND gate 17, a third AND gate 18, a third NOR gate 19, and a third inverter 20.

The output of the NAND gate 13 feeds a first input of the first AND gate 16 and a first input of the third NOR gate 19 through the third inverter 20. The respective second inputs of the first AND gate 16 and of the third NOR gate 19 are connected to one another, as well as to data input D of the logic circuit 12. The output of the first AND gate 16 is connected to the first input of the second AND gate 17, and the output of the third NOR gate 19 is connected to the first input of the third AND gate 18. The respective second inputs of the second and third AND gates 17 and 18 are connected to one another, and to the clock input T of the logic circuit 12. The output of the second AND gate 17 controls the clock input of the first enable flip-flop 14, and that of the third AND gate 18 that of the second enable flip-flop 15. The D-inputs and the preset inputs P of both enable flip-flops 14 and 15 are connected to a logical "1" value. The Q output of the first enable flip-flop 14 is connected to the first output $A_1$, and that of the second enable flip-flop 15 to the second output $B_1$ of the logic circuit 12. The first reset input $R_1$ of the logic circuit 12 is connected to the clear input C of the first enable flip-flop 14, and its second reset input $R_2$ to the clear input C of the second enable flip-flop 15.

Functional Description of the Logic Circuit of FIG. 3

At the N-bit input of the logic circuit 12 there appear successively the N-bit data values $x_j$, and at its data input D there appears the least significant bit $Q_1$ of the addresses associated with the data values $x_j$ of the read only memory 3.

If the data value $x_j$ differs from 255="11111111", and if the associated address is even, namely if $Q_1$="0", then there appears at the output of the third NOR gate 19 a logic "1" which switches over the inverted clock signal CL3 from the clock input T of the logic circuit 12 to the clock input of the second enable flip-flop 15 with the aid of the third AND gate 18, so that the flip-flop 15 flips over at the time of receiving the positive-going edge of the inverted clock signal CL3, and enables the count of the associated second period counter 5 shown in FIG. 1. If the data value $x_j$ differs from 255="11111111", and if the associated address is odd, in this case, namely if $Q_1$="1", then there appears at this time at the output of the first AND gate 16 a logic "1", which switches the inverted clock signal CL3 to the clock input of the first enable flip-flop 14 with the aid of the second AND gate 17, so that the flip-flop 14 enables the output count of the first period counter 4 shown in FIG. 1 at the correct time.

The reset of each flip-flop 14 or 15 is accomplished at the end of each count, if there appears a logic "1" at the output of an associated period counter 4 or 5, and is accomplished through the first NOR gate 8 shown in FIG. 1 and the first reset input $R_1$, or through the second NOR gate 9 shown in FIG. 1 and the second reset input $R_2$. If the count of the associated period counter 4 or 5 is not enabled, then there exist a logical "0" at its enable input which enables next loading of the period counter.

I wish it to be understood that I do not desire to be limited to the exact details of construction shown and described for obvious modifications will occur to a person skilled in the art.

Having thus described the invention what I claim as new and desire to be secured by Letters Patent is as follows:

1. In a method of obtaining digital periodic time function signals with the aid of a memory (3) having a plurality of storage cells, each time function signal having a first period (T), predetermined binary numbers stored in corresponding storage cells defining each periodic time function signal,
the steps comprising for each of said digital periodic time function signals calculating a first group of binary numbers ($x_j$) representing relative time values of their positive and negative going edges by choosing for each of said relative time values an own zero reference point by taking into account the delay time of said memory (3), by using a second period ($T_2$) as a time unit, allotting to said binary numbers ($x_j$) a predetermined, normally not used binary number (255="11111111"), in each case an edge is not to be produced, assigning a prearranged number of said storage cells to each of said digital periodic time function signals to be obtained, storing each one of said first groups of binary numbers ($x_j$) in those of said storage cells which belong to said digital periodic time function signal, and in such an order of succession that increasing absolute time values related to said binary numbers ($x_j$) correspond to increasing values of memory addresses, whereby said absolute time values correspond to said relative time values with the difference that the absolute time values have a single zero reference point common for all of them, generating a first clock signal (CL1) for resetting purposes, having a period ($T_1$) equal to said first period (T) of said digital periodic time function signals, generating a second clock signal (CL2) having said second period ($T_2$), which has a predetermined relationship to said first period (T), deriving from said second clock signal (CL2) a third clock signal (CL3), having a third period ($T_3$) which is a multiple of said second period ($T_2$), binary counting the number of said third periods ($T_3$) with the aid of an address counter (2) and allotting this second group of binary numbers to said memory addresses of said storage cells, successive calling up said different storage cells belonging to said digital periodic time function signal, with the aid of said second group of binary numbers and the address inputs of said memory (3), and thereby successively reading of said binary numbers ($x_j$) of said first group of binary numbers out of said memory (3), successive parallel loading said binary numbers ($x_j$) of said first group of binary numbers in period counters (4; 5), delayed enabling between each of said loadings during an enabling time interval, only the counting of one of said period counters (4; 5) with the aid of a logic circuit (12), if an edge of said digital periodic time function signal which belongs to said one period counter must be produced during said enabling time interval, counting the number of second periods ($T_2$) during said enabling time beginning with said loaded binary number ($x_j$) of said first group of binary numbers until a predetermined reference number is reached, in the moment of reaching said predetermined reference number, inverting the digital instantaneous value of said digital periodic time function signal at the output of a D-flip-flop (6; 7) with the aid of this D-flip-flop.

2. The method as claimed in claim 1, wherein said digital time function signals are "Chirp"-signals.

3. The method as claimed in claim 1 or 2, wherein said digital time function signals include first and second time function signals, and further comprising the steps of assigning a "logical 1" value to said first time function signal, and a logical "0" value to said second time function signal.

4. The method as claimed in claim 1 further comprising the step of choosing said relative time values represented by binary numbers ($x_j$) of said first group of binary numbers at most equal to h times said third period ($T_3$), wherein h equals the number of said periodic time function signals, and wherein the step of calling up said storage cells is performed in a timemultiplexed manner for said different periodic time function signals.

5. The method as claimed in claim 1 further comprising the step of choosing said relative time values represented by binary numbers ($x_j$) of said first group of binary numbers at most equal to said third period ($T_3$), when all of said time function signals have the same memory addresses.

6. The method as claimed in claim 4, wherein h equals two, and further comprising the steps of assigning even memory addresses to one of the time function signals, and odd memory addresses to the other time function signal.

7. The method as claimed in claim 1 wherein said counting of second periods ($T_2$) is a down counting.

8. The method as claimed in claim 1 wherein said counting of second periods ($T_2$) is an up counting, and wherein said first group of binary numbers consists of binary numbers ($2^N - 1 - x_j$) and each up count terminates at the value ($2^N - 1$), where N is the number of bits employed in said digital binary number.

9. The method as claimed in claim 1 further comprising the step of choosing the delay time of said delayed enabling equal to about one-half said third period $T_3$.

10. The method as claimed in claim 1 further comprising the step of setting the period T of each periodic time function signal equal to one-half the period of the mains supply frequency.

11. The method as claimed in claim 10 further comprising the step of resetting said counting of third periods ($T_3$) at the beginning of each period T in synchronism with the frequency of the mains supply system.

12. The method as claimed in claim 1 wherein said periodic time function signals are reference signals of a coherence receiver.

13. The method as claimed in claim 12, further comprising the step of connecting said coherence receiver to the mains supply so as to receive intelligence information transmitted over said mains supply.

* * * * *